United States Patent
Foster et al.

(10) Patent No.: US 6,956,069 B2
(45) Date of Patent: Oct. 18, 2005

(54) ACRYLIC LATEX WOOD FILLER COMPOSITION AND METHOD OF MAKING SAME

(75) Inventors: Van R Foster, Westerville, OH (US); Andrew P. Bonifas, Columbus, OH (US)

(73) Assignee: Hunt Holdings, Inc., Wilmington, DE (US)

( * ) Notice: Subject to any disclaimer, the term of this patent is extended or adjusted under 35 U.S.C. 154(b) by 92 days.

(21) Appl. No.: 10/285,737

(22) Filed: Nov. 1, 2002

(65) Prior Publication Data

US 2004/0087683 A1 May 6, 2004

(51) Int. Cl.$^7$ .............................. C08K 7/28; C08L 1/02
(52) U.S. Cl. ........................ 523/219; 524/13; 524/425
(58) Field of Search ............................ 523/219; 524/13, 524/425

(56) References Cited

U.S. PATENT DOCUMENTS 4,345,044 A    8/1982    Columbus et al. .......... 523/220

*Primary Examiner*—Peter Szekely
(74) *Attorney, Agent, or Firm*—McNees Wallace & Nurick LLC; Kurt L. Ehresman; Jonathan P. Miller

(57) ABSTRACT

In broadest terms, a wood filler composition of the present invention comprises: from about 11.50 to about 17.50 weight percent water; from about 14.40 to about 21.60 weight percent ceramic microspheres; from about 2.48 to about 3.72 weight percent wood flour; from about 0.32 to about 0.48 weight percent thickener; from about 0.80 to about 1.20 weight percent glass bubbles; from about 12.24 to about 18.36 weight percent acrylic latex emulsion; and from about 36.06 to about 54.10 weight percent calcium carbonate. The composition preferably has a pH in the range of from about 8.4 to about 8.8. Further the composition preferably has a viscosity of 200,000 to 300,000 cps as measured on a BROOKFIELD RV viscometer (helipath on) with a T/E spindle at 20 rpm and 25° C.

14 Claims, No Drawings

ACRYLIC LATEX WOOD FILLER COMPOSITION AND METHOD OF MAKING SAME

TECHNICAL FIELD OF THE INVENTION

The present invention is directed towards wood filler compositions. Specifically, the present invention is directed towards acrylic latex wood filler compositions that are non-toxic and non-flammable, as defined by the Federal Hazardous Substances Act.

BACKGROUND OF THE INVENTION

Presently there are a multitude of wood filler compositions in the market. These wood filler compositions can generally be classified into one of two categories. The first category comprises solvent-based wood filler compositions. The second category comprises water-based wood filler compositions.

Solvent-based wood filler compositions are not generally favored because they require the use of a solvent for clean-up. Further, solvent-based wood filler compositions may be flammable due to the solvent. The solvent may also cause excessive shrinkage of the wood filler composition as it dries. Oftentimes, solvent-based wood fillers are not as durable as one would desire.

Water-based wood filler compositions are generally susceptible to attack by water. Additionally, it is oftentimes difficult for a water-based wood filler composition to accept stain, thereby causing dissatisfaction with the product.

SUMMARY OF THE INVENTION

The present invention overcomes many of the disadvantages of prior art solventborne wood fillers. Wood fillers of the present invention are non-flammable; exhibit minimal, if any, shinkage; offer improved durability (i.e. no surface polishing) with a superior wood grain appearance; and accept stain better due to the presence of hardwood fibers and microspheres.

Further, the present invention overcomes many disadvantages of prior art waterborne wood fillers. Comparatively, wood fillers of the present invention offer better water resistance, improved stain acceptance (i.e. no over-staining), and improved durability (i.e. no stain loss after weathering).

In broadest terms, a wood filler composition of the present invention comprises: from about 11.50 to about 17.50 weight percent water; from about 14.40 to about 21.60 weight percent ceramic microspheres; from about 2.48 to about 3.72 weight percent wood flour; from about 0.32 to about 0.48 weight percent thickener; from about 0.80 to about 1.20 weight percent glass bubbles; from about 12.24 to about 18.36 weight percent acrylic latex emulsion; and from about 36.06 to about 54.10 weight percent calcium carbonate. The composition preferably has a pH in the range of from about 8.4 to about 8.8. Further the composition preferably has a viscosity of from about 200,000 to about 300,000 cps as measured on a BROOKFIELD RV viscometer (helipath on) with a T/E spindle at 20 rpm and 25° C.

While any suitable ceramic microspheres may be used in the present invention, it is preferred that the ceramic microspheres are G-3125 Z-LIGHT SPHERES sold by 3M.

Further, any suitable wood flour (or combinations of wood flours) may be employed, however, it is preferred that the wood flour is a 60-mesh sized wood flour. It is more preferred that hardwood wood flour be used in the present invention. A preferred wood flour for use with the present invention is maple wood flour in 60-mesh size as sold by Lang Fiber Products.

Additionally, a wide variety of thickeners may be used in the practice of the present invention, however, it is preferred that the thickener is a methyl cellulose thickener, such as METHOCEL E-4-M sold by Dow Chemical.

Although many acrylic latex emulsions are suitable for use with the present invention, a preferred acrylic latex is RHOPLEX E-330, sold by Rohm and Haas. RHOPLEX E-330 acrylic emulsion has a non-ionic charge, percent solids content of about 47%, and a pH of 9.5 to 10.0. A second preferred acrylic latex for use with the present invention is RHOPLEX AC-2235, also from Rohm and Haas. It is preferred that more than one acrylic latex is used in the present invention. It is more preferred that both RHOPLEX E-330 and RHOPLEX AC-2235 are used. It is most preferred that the RHOPLEX E-330 and RHOPLEX AC-2235 acrylic emulsions are used in an approximately 2:1 ratio.

Although many calcium carbonates may be used with the present invention, a preferred calcium carbonate is #10 WHITE (GSP-40) available from ECC International. A second preferred calcium carbonate is OMYACARB 6 from Omya Inc. It is preferred that more than one calcium carbonate is used in the present invention. It is even more preferred that both #10 WHITE (GSP-40) and OMYACARB 6 are used. It is most preferred that the #10 WHITE (GSP-40) and OMYACARB 6 calcium carbonates are used in an approximately 2.6:1 ratio.

It is preferred that the wood filler composition of the present invention additionally comprises at least one biocide. Although a functional amount of biocide should be used in the present invention, it is preferred that the biocide (s) constitute(s) from about 0.05 to about 0.15 weight percent of the wood filler composition. It is most preferred that the at least one biocide is ACTICIDE LA sold by Actichem.

It is further preferred that the wood filler composition of the present invention additionally comprises at least one surfactant. Although a functional amount of surfactant(s) should be used in the present invention, it is preferred that the surfactant(s) constitute(s) from about 0.01 to about 0.80 weight percent of the wood filler composition. It is more preferred that the surfactant is TRITON X-405, sold by Rohm and Haas. The surfactant may be a non-ionic surfactant such as NOPCO NXZ, sold by Henkel.

Additionally, it is preferred that the wood filler composition of the present invention comprises at least one stabilizer. It is preferred that at least one stabilizer is a freeze-thaw stabilizer. A preferred freeze-thaw stabilizer is propylene glycol. Although a functional amount of stabilizer (s) should be used in the present invention, it is preferred that the stabilizer(s) constitute(s) from about 0.50 to about 1.50 weight percent of the wood filler composition.

Wood filler compositions of the present invention may additionally comprise at least one mildewcide. A preferred mildewcide is SKANE M8, sold by Rohm and Haas. Although a functional amount of mildewcide(s) should be used in the present invention, it is preferred that the mildewcide(s) constitute from about 0.05 to about 0.15 weight percent of the wood filler composition.

Wood filler compositions of the present invention may additionally comprise at least one colorant. The quantity of colorant(s) used will vary as a matter of choice and necessity. However, it is preferred that the colorant(s) constitute from about 0.01 to about 0.30 weight percent of the wood filler composition. If necessary, a pigment dispersant may be required to ensure that the colorant(s) is dispersed throughout the wood filler composition. While a functional amount of pigment dispersant should be used, it is preferred that the pigment dispersant constitute from about 0.01 to about 0.50 weight percent of the wood filler composition. For example, TINT-AYD WD-2509 Burnt Umber (available from Elementis Specialties) and AQUA YELLOW 597-49 (available from Borden Chemical) may be used to impart a "natural" color to the wood filler composition. TAMOL 851, sold by Rohm and Haas, is a pigment dispersant that not only disperses the colorants throughout the composition but also helps to stabilize them as well.

A preferred method for preparing a wood filler composition of the present invention comprises the steps of: (a) providing a mixing vessel; (b) placing water, at least one biocide, at least one surfactant, and at least one stabilizer in the mixing vessel under slow agitation; (c) mixing this combination of ingredients until substantially homogeneous; (d) adding at least one acrylic latex emulsion to the mixing vessel while agitating; (e) mixing the contents of the mixing vessel until substantially homogeneous; (f) adding at least one ceramic microsphere and at least one wood flour to the mixing vessel while agitating; (g) mixing the contents of the mixing vessel until homogeneous; (h) adding at least one mildewcide to the mixing vessel while agitating; (i) mixing the contents of the mixing vessel until substantially homogeneous; (j) adding water and at least one surfactant to the mixing vessel while agitating; (k) mixing the contents of the mixing vessel until substantially homogeneous; (l) adding at least one glass bubble to the mixing vessel under slow agitation; (m) mixing the contents of the mixing vessel under slow agitation until substantially homogeneous; and (n) adding water to the mixing vessel in sufficient quantity so as to produce a wood filler composition having a viscosity of from about 200,000 to about 300,000 cps and a pH of from about 8.4 to about 8.8.

The method may additionally comprise the step of adding at least one pigment dispersant. It is preferred that the step of adding the at least one pigment dispersant is performed at the same time as the addition of the water, the at least one biocide, the at least one surfactant, and the at least one stabilizer to the mixing vessel.

The method may additionally comprise the steps of (a) adding at least one pigment to the mixing vessel; and (b) mixing the contents of the mixing vessel until the at least one pigment is evenly dispersed throughout. It is more preferred that these steps are performed prior to the addition acrylic latex emulsions.

Finally, it is preferred that at least one of said at least one stabilizer is a freeze-thaw stabilizer.

In addition to the novel features and advantages mentioned above, other objects and advantages of the present invention will be readily apparent from the following description of the preferred embodiment(s).

DETAILED DESCRIPTION OF THE PREFERRED EMBODIMENT(S)

In accordance with the foregoing summary, the following presents a detailed description of the preferred embodiment of the invention that is currently considered to be the best mode.

The present invention is directed towards a wood filler composition and method of making the wood filler composition. The wood filler composition of the present invention is particularly useful for repairing damage to wood components.

A preferred composition of the present invention comprises, on a weight percent basis:

| Item No. | Ingredients | % by Weight |
|---|---|---|
| 1 | Water | 11.00 |
| 2 | ACTICIDE LA | 0.10 |
| 3 | TRITON X-405 | 0.71 |
| 4 | TAMOL 851 | 0.35 |
| 5 | Propylene glycol | 1.00 |
| 6 | NOPCO NXZ | 0.03 |
| 7 | TINT-AYD WD-2509 Burnt Umber | 0.06 |
| 8 | AQUA YELLOW 597-49 | 0.25 |
| 9 | Water | 0.80 |
| 10 | RHOPLEX E-330 | 10.35 |
| 11 | RHOPLEX AC-2235 | 4.95 |
| 12 | METHOCEL E-4-M | 0.40 |
| 13 | #10 WHITE (GSP-40) | 32.50 |
| 14 | OMYACARB 6 | 12.58 |
| 15 | SKANE M8 | 0.10 |
| 16 | Glass Bubbles | 1.00 |
| 17 | Water | 0.50 |
| 18 | NOPCO NXZ | 0.03 |
| 19 | Water | 2.19 |
| 20 | Maple Wood Flour - 60 mesh | 3.10 |
| 21 | G-3125 Z-LIGHT SPHERES | 18.00 |
| | TOTAL: | 100.00 |

The above formulation has a pH of 8.4–8.8, total solids of 77.0–78.0%, a viscosity of 270,000 cps, natural color, and a weight per gallon of about 8.6 pounds.

The following describes a preferred methodology for compounding the preferred wood filler composition described above, with reference to the "Item Nos." used above:

Place items 1, 2, 3, 4, 5, and 6 into a clean mixing vessel under slow agitation. Blend until the mixture is homogeneous. Next, add items 7, 8, and 9 to the mixing vessel under agitation and mix until the color pigments are evenly dispersed. Next, add items 10 and 11 to the mixing vessel under agitation and mix until mixture is homogeneous. Next, add items 12, 13 and 14 to the mixing vessel under agitation and mix until homogeneous. Then add items 20 and 21 to the mixing vessel under agitation and continue mixing until the mixture is homogeneous. Next, item 15 is added to the vessel and mixed into the batch. Then items 17 and 18 are added to the mixing vessel and mixed evenly into batch. Item 16 is added to the mixing vessel under slow agitation and mixed until mixture is homogeneous. Finally, item 19 is added in increments to achieve desired viscosity, weight per gallon, and pH levels.

Surfaces to which the wood filler of the present invention is to be applied should be clean, dry and free of grease, oil and loose particles. The surface and the wood filler should be at a temperature of 40° F. or warmer. Application of the wood filler should be generous and excess can be removed with a putty knife but some extra wood filler should remain to allow for flush sanding after drying. For normal repairs, one application usually suffices although for deeper cracks, two or more applications are better than one heavy one. The wood filler must dry between applications. Shallow repairs can be sanded after 15 minutes of application but deep repairs require 1 to 8 hours. Avoid high speed sanding. If a machine sander is used, use on-off-on-off action. Desired finish may be applied after sanding, one hour being allowed for drying of water-based paint and overnight for oil-based paint, shellac or varnish. Stain should be applied within 1 hour after sanding. Staining requires medium to coarse sanding for best results. If fine-sanded, stain will need more time for penetration. For true color match, test wood scrap to determine proper stain color and time for both filler and wood. After finishing a job, tools and hands can be washed with water before wood filler dries.

While the invention has been described in connection with what is presently considered to be the most practical and preferred embodiments, it is to be understood that the invention is not to be limited to the disclosed embodiment(s), but on the contrary, is intended to cover various modifications and equivalent arrangements included within the spirit and scope of the appended, claims, which are incorporated herein by reference.

What is claimed is:

1. A wood filler composition, said composition comprising:
   from about 11.50 to about 17.50 weight percent water;
   from about 14.40 to about 21.60 weight percent ceramic microspheres;
   from about 2.48 to about 3.72 weight percent wood flour;
   from about 0.32 to about 0.48 weight percent thickener;
   from about 0.80 to about 1.20 weight percent glass bubbles;
   from about 12.24 to about 18.36 weight percent acrylic latex emulsion containing about 46 to about 48 weight percent solids; and
   from about 36.06 to about 54.10 weight percent calcium carbonate, wherein said composition has a pH in the range of from about 8.4 to about 8.8, said composition having a viscosity of from about 200,000 to about 300,000 cps.

2. The wood filler composition according to claim 1 wherein said wood flour is a 60-mesh sized wood flour.

3. The wood filler composition according to claim 1 wherein said thickener is a methyl cellulose thickener.

4. The wood filler composition according to claim 1 further comprising at least one biocide.

5. The wood filler composition according to claim 1 further comprising at least one surfactant.

6. The wood filler composition according to claim 1 further comprising at least one stabilizer.

7. The wood filler composition according to claim 6 wherein said at least one stabilizer comprises a freeze-thaw stabilizer.

8. The wood filler composition according to claim 1 further comprising at least one mildewcide.

9. The wood filler composition according to claim 1 further comprising at least one pigment dispersant.

10. The wood filler composition according to claim 8 further comprising at least one colorant.

11. A method for preparing the wood filler composition of claim 1, said method comprising the steps of:
    providing a mixing vessel;
    placing water, at least one biocide, at least one surfactant, and at least one stabilizer in said mixing vessel under slow agitation;
    mixing until substantially homogeneous;
    adding at least one acrylic latex emulsion to said mixing vessel while agitating;
    mixing until substantially homogeneous;
    adding at least one ceramic microsphere and at least one wood flour to said
    mixing vessel while agitating;
    mixing until homogeneous;
    adding at least one mildewcide to said mixing vessel while agitating;
    mixing until substantially homogeneous;
    adding water and at least one surfactant to said mixing vessel while agitating;
    mixing until substantially homogeneous;
    adding at least one glass bubble to said mixing vessel under slow agitation;
    mixing until substantially homogeneous; and
    adding water to said mixing vessel in sufficient quantity so as to produce a wood filler composition having a viscosity of from about 200,000 to about 300,000 cps and a pH of from about 8.4 to about 8.8.

12. The method according to claim 11 additionally comprising the step of: adding at least one pigment dispersant to said mixing vessel.

13. The method according to claim 11 additionally comprising the steps of:
    adding at least one pigment to said mixing vessel; and
    mixing until said at least one pigment is evenly dispersed.

14. The method according to claim 11 wherein at least one of said at least one stabilizer is a freeze-thaw stabilizer.

* * * * *